US012756458B2

(12) United States Patent
Gronstad et al.

(10) Patent No.: US 12,756,458 B2
(45) Date of Patent: Oct. 6, 2026

(54) GEOLOCATION BASED RESOURCE MANAGEMENT FOR SATELLITES IN A NON-TERRESTRIAL NETWORK

(71) Applicant: T-Mobile USA, Inc., Bellevue, WA (US)

(72) Inventors: Egil Gronstad, Bellevue, WA (US); Jun Liu, Sammamish, WA (US); Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 273 days.

(21) Appl. No.: 18/750,078

(22) Filed: Jun. 21, 2024

(65) Prior Publication Data

US 2025/0392380 A1 Dec. 25, 2025

(51) Int. Cl.
*H04B 7/185* (2006.01)

(52) U.S. Cl.
CPC ................................ *H04B 7/18543* (2013.01)

(58) Field of Classification Search
CPC .................................................. H04B 7/18543
USPC .......................................................... 455/427
See application file for complete search history.

(56) References Cited

U.S. PATENT DOCUMENTS 5,590,395 A 12/1996 Diekelman
5,713,075 A 1/1998 Threadgill et al.
5,842,125 A 11/1998 Modzelesky et al.
5,926,745 A 7/1999 Threadgill et al.
6,021,309 A 2/2000 Sherman et al.
6,067,442 A * 5/2000 Wiedeman ......... H04B 7/18545 370/320
6,067,453 A 5/2000 Adiwoso et al.
6,185,409 B1 2/2001 Threadgill et al.
6,272,341 B1 8/2001 Threadgill et al.
6,381,228 B1 4/2002 Prieto et al.
6,498,788 B1 12/2002 Emilsson et al.
(Continued)

FOREIGN PATENT DOCUMENTS

CN 101873652 B 10/2012
CN 103347164 B 2/2017
(Continued)

OTHER PUBLICATIONS

Alam et al., "On the Role of Non-Terrestrial Networks for Boosting Terrestrial Network Performance in Dynamic Traffic Scenarios", arXiv:2405.14053v1 [cs.NI], May 22, 2024, pp. 1-3.
(Continued)

*Primary Examiner* — Mark G. Pannell
(74) *Attorney, Agent, or Firm* — Ashurst Perkins Coie US LLP

(57) ABSTRACT

The technology is directed to a system that allocates a frequency band to a satellite within a non-terrestrial network (NTN) and determines the available channel bandwidth for data transmissions within that frequency band. If the satellite detects an absence of a Radio Resource Control (RRC) connection between the satellite and at least one terminal device within the geographical location, which indicates a lack of active communication with the terminal devices, the satellite responds by transmitting signals at a reduced transmit power and within a portion of the available channel bandwidth towards the geographical location. The RRC connection can be managed by an RRC protocol.

20 Claims, 7 Drawing Sheets

(56) References Cited

U.S. PATENT DOCUMENTS 6,850,497 B1 * 2/2005 Sigler .................. H04B 7/1853 455/526
6,859,652 B2 2/2005 Karabinis et al.
6,904,265 B1 6/2005 Valdivia et al.
6,920,121 B2 7/2005 Tan
7,170,877 B2 1/2007 Livet et al.
7,236,738 B2 6/2007 Settle
7,450,914 B2 11/2008 Valdivia et al.
7,596,379 B2 9/2009 Farnsworth et al.
7,630,338 B2 12/2009 Vesterinen et al.
7,680,478 B2 3/2010 Willars et al.
7,801,105 B2 9/2010 Larsson et al.
7,864,726 B2 1/2011 Lee et al.
7,898,995 B2 3/2011 Shahidi et al.
7,949,377 B2 5/2011 Islam et al.
8,090,380 B2 1/2012 Islam et al.
8,112,091 B2 2/2012 Chun et al.
8,121,605 B2 2/2012 Monte et al.
8,144,679 B2 3/2012 Cai et al.
8,208,950 B2 6/2012 Islam et al.
8,228,890 B2 7/2012 Leppisaari et al.
8,266,240 B2 9/2012 Marjelund et al.
8,315,194 B2 11/2012 Jeong et al.
8,345,585 B2 1/2013 De Jaeger et al.
8,355,353 B2 1/2013 Gonsa et al.
8,433,332 B2 4/2013 Agarwal
8,452,295 B2 5/2013 Pedersen et al.
8,982,773 B2 3/2015 Ros et al.
9,560,657 B2 1/2017 Ekici et al.
9,578,441 B2 2/2017 Gerber et al.
9,622,171 B2 4/2017 Voigt et al.
9,628,168 B2 4/2017 Wharton et al.
9,713,164 B2 7/2017 Gupta et al.
9,713,197 B2 7/2017 Kim et al.
9,736,844 B2 8/2017 Tayrac et al.
9,743,459 B2 8/2017 Shah et al.
9,750,079 B1 8/2017 Mitchell
9,794,973 B2 10/2017 Kim et al.
9,794,980 B2 10/2017 Hwang et al.
9,814,004 B2 11/2017 Touret et al.
9,854,564 B2 12/2017 Chun et al.
9,860,027 B2 1/2018 Christoffersson et al.
9,871,579 B2 1/2018 Kang et al.
9,906,977 B2 2/2018 Tabet et al.
9,955,507 B2 4/2018 Chun et al.
9,999,095 B2 6/2018 Kweon et al.
10,070,347 B2 9/2018 Manepalli et al.
10,211,909 B2 2/2019 Vargas et al.
10,524,159 B2 12/2019 Xenakis et al.
10,638,486 B2 4/2020 Luo et al.
11,171,719 B2 11/2021 Cui et al.
11,363,666 B2 6/2022 Wang et al.
11,510,273 B2 11/2022 Wang et al.
11,757,526 B1 9/2023 Chen et al.
11,864,262 B2 1/2024 Liu et al.
2001/0012775 A1 * 8/2001 Modzelesky ......... H04W 12/06 455/430
2001/0019942 A1 * 9/2001 Tawil ..................... H04H 40/90 455/13.1
2002/0061742 A1 5/2002 Lapaille et al.
2002/0072389 A1 * 6/2002 Ward ................. H04B 7/18567 455/552.1
2004/0229616 A1 * 11/2004 Dutta ................. H04B 7/18541 455/436
2004/0240383 A1 12/2004 Davolos et al.
2005/0063304 A1 * 3/2005 Sillasto ................. H04W 76/38 370/229
2005/0141472 A1 * 6/2005 Shin ................... H04B 7/18513 370/342
2005/0281222 A1 * 12/2005 Ranta-Aho ........... H04W 76/27 370/328
2007/0171932 A1 7/2007 Basuthakur et al.
2007/0287469 A1 12/2007 Wijting et al.
2008/0014959 A1 1/2008 Karlsson
2008/0090583 A1 4/2008 Wang et al.
2008/0261530 A1 10/2008 Gerstenberger et al.
2009/0109907 A1 4/2009 Tsai et al.
2010/0118752 A1 5/2010 Suzuki et al.
2010/0197313 A1 8/2010 Suronen et al.
2010/0216436 A1 8/2010 Wijayanathan et al.
2010/0254340 A1 10/2010 Park et al.
2011/0028144 A1 2/2011 Catovic et al.
2012/0020393 A1 1/2012 Patil et al.
2012/0208527 A1 8/2012 Park
2012/0208548 A1 8/2012 Park
2013/0003591 A1 * 1/2013 Novak ................ H04W 72/542 370/252
2013/0064107 A1 3/2013 Sridhar
2013/0244571 A1 * 9/2013 Hong ................. H04B 7/18586 455/12.1
2013/0250828 A1 * 9/2013 Chou .................... H04W 72/23 370/329
2013/0331114 A1 * 12/2013 Gormley ............... H04W 28/18 455/452.1
2014/0016614 A1 * 1/2014 Velev .................... H04W 76/10 370/331
2014/0056133 A1 * 2/2014 Forssell ................ H04W 76/22 370/230
2014/0087653 A1 * 3/2014 Jo ......................... H04W 24/02 455/10
2015/0003361 A1 * 1/2015 Palat ..................... H04W 76/10 370/329
2015/0029918 A1 1/2015 Bangolae et al.
2015/0126209 A1 * 5/2015 Gloss .................. H04W 72/542 455/452.1
2015/0327032 A1 11/2015 Hedman et al.
2015/0327312 A1 11/2015 Burbidge et al.
2015/0358861 A1 * 12/2015 Chuberre ........... H04B 7/18515 455/13.1
2016/0119896 A1 4/2016 Jujaray et al.
2016/0134359 A1 * 5/2016 Hirsch ................. H04B 7/2041 370/319
2017/0026950 A1 * 1/2017 Cao ....................... H04L 5/0032
2017/0048747 A1 2/2017 Tiwari
2017/0064771 A1 3/2017 Manepalli et al.
2017/0251516 A1 8/2017 Bangolae et al.
2017/0289874 A1 * 10/2017 Li ..................... H04W 36/0072
2018/0070327 A1 3/2018 Qureshi et al.
2019/0037475 A1 * 1/2019 Zhang ................... H04W 76/10
2019/0068742 A1 * 2/2019 Harrington ........ H04B 7/18578
2019/0097717 A1 * 3/2019 Gayrard ............. H04B 7/18515
2019/0199425 A1 * 6/2019 Singh .................... H04W 16/14
2019/0349970 A1 11/2019 Chen
2020/0037391 A1 1/2020 Cui et al.
2020/0305097 A1 * 9/2020 Bergquist .............. H04W 76/28
2020/0305218 A1 9/2020 Zhu et al.
2020/0344838 A1 10/2020 Wu et al.
2021/0014934 A1 1/2021 Lovlekar et al.
2021/0076450 A1 3/2021 Jiang et al.
2021/0175963 A1 * 6/2021 Chang ................ H04B 7/18584
2021/0345344 A1 * 11/2021 Sha ....................... H04W 72/53
2021/0392578 A1 12/2021 Li et al.
2021/0409984 A1 12/2021 Agiwal et al.
2022/0014608 A1 * 1/2022 Ma .......................... H04L 69/08
2022/0061063 A1 * 2/2022 Patel ................. H04W 28/0268
2022/0095331 A1 * 3/2022 Laselva ................. H04W 76/27
2022/0132277 A1 4/2022 Shrivastava et al.
2022/0191966 A1 6/2022 Wang
2022/0264517 A1 8/2022 Liu et al.
2022/0272767 A1 8/2022 Liu et al.
2022/0278742 A1 * 9/2022 Gineste ................ H04B 7/1858
2022/0287099 A1 9/2022 Alba et al.
2023/0049868 A1 2/2023 Zhou et al.
2023/0069465 A1 3/2023 Vangala et al.
2023/0088189 A1 3/2023 Tseng et al.
2023/0121634 A1 4/2023 Shrestha et al.
2023/0156823 A1 5/2023 Xu et al.
2023/0164628 A1 5/2023 Zou et al.
2023/0170987 A1 6/2023 Lien et al.
2023/0208511 A1 * 6/2023 Yu ...................... H04B 7/18532 370/316

(56) References Cited

U.S. PATENT DOCUMENTS

| | | | | |
|---|---|---|---|---|
| 2023/0239661 | A1* | 7/2023 | Pham Van | H04W 4/06 370/329 |
| 2024/0048232 | A1 | 2/2024 | Catovic et al. | |
| 2024/0048458 | A1 | 2/2024 | Hardy et al. | |
| 2024/0053483 | A1* | 2/2024 | Kowalski | G01S 19/02 |
| 2024/0064632 | A1 | 2/2024 | Zorgui et al. | |
| 2024/0314705 | A1* | 9/2024 | Jang | G01S 19/51 |
| 2025/0008352 | A1* | 1/2025 | Prasad | H04B 7/18563 |
| 2025/0071662 | A1* | 2/2025 | Palermo | H04B 7/18519 |
| 2025/0106783 | A1* | 3/2025 | Menon | H04W 52/146 |

FOREIGN PATENT DOCUMENTS

| | | | |
|---|---|---|---|
| CN | 107769840 | B | 10/2020 |
| CN | 112272412 | B | 6/2021 |
| CN | 115396952 | A | 11/2022 |
| CN | 115913329 | B | 6/2024 |
| DE | 102005018798 | A1 | 10/2006 |
| DE | 102006054454 | B4 | 1/2009 |
| DE | 202009018407 | U1 | 1/2012 |
| DE | 202005022050 | U1 | 11/2012 |
| DE | 102012111257 | A1 | 7/2013 |
| EP | 1169836 | B1 | 7/2003 |
| EP | 2093940 | A1 | 8/2009 |
| EP | 2290842 | A2 | 3/2011 |
| EP | 2887564 | A1 | 6/2015 |
| JP | 2849009 | B2 | 1/1999 |
| JP | 4436502 | B2 | 1/2010 |
| JP | 4612523 | B2 | 10/2010 |
| JP | 4703171 | B2 | 6/2011 |
| JP | 2014175935 | A | 9/2014 |
| JP | 2015520533 | A | 7/2015 |
| JP | 2015523014 | A | 8/2015 |
| JP | 6349578 | B2 | 6/2018 |
| JP | 6351535 | B2 | 6/2018 |
| JP | 6461053 | B2 | 1/2019 |
| JP | 2019086869 | A | 6/2019 |
| JP | 2021501533 | A | 1/2021 |
| JP | 6917390 | B2 | 7/2021 |
| JP | 7095005 | B2 | 6/2022 |
| KR | 20000029305 | A | 5/2000 |
| KR | 20000047232 | A | 7/2000 |
| KR | 100412972 | B1 | 12/2003 |
| KR | 20040019543 | A | 3/2004 |
| KR | 100546800 | B1 | 1/2006 |
| KR | 100660141 | B1 | 12/2006 |
| KR | 100706300 | B1 | 4/2007 |
| KR | 100791410 | B1 | 1/2008 |
| KR | 100860050 | B1 | 9/2008 |
| KR | 20090012714 | A | 2/2009 |
| KR | 100912112 | B1 | 8/2009 |
| KR | 101005613 | B1 | 1/2011 |
| KR | 101013227 | B1 | 2/2011 |
| KR | 101037336 | B1 | 5/2011 |
| KR | 20130104337 | A | 9/2013 |
| KR | 101336881 | B1 | 12/2013 |
| KR | 101361200 | B1 | 2/2014 |
| KR | 101386198 | B1 | 4/2014 |
| KR | 20140041074 | A | 4/2014 |
| KR | 20140116435 | A | 10/2014 |
| KR | 20150032148 | A | 3/2015 |
| KR | 101611319 | B1 | 4/2016 |
| KR | 20160060152 | A | 5/2016 |
| KR | 20170058116 | A | 5/2017 |
| KR | 101930703 | B1 | 12/2018 |
| KR | 101964349 | B1 | 4/2019 |
| KR | 101988476 | B1 | 9/2019 |
| KR | 20210060586 | A | 5/2021 |
| KR | 20210114984 | A | 9/2021 |
| KR | 102570814 | B1 | 8/2023 |
| WO | 9720362 | A1 | 6/1997 |
| WO | 03096730 | A1 | 11/2003 |
| WO | 2010097682 | A2 | 9/2010 |
| WO | 2012037637 | A1 | 3/2012 |
| WO | 2012136291 | A2 | 10/2012 |
| WO | 2015114729 | A1 | 8/2015 |
| WO | 2016130264 | A1 | 8/2016 |
| WO | 2017095293 | A1 | 6/2017 |
| WO | 2017166221 | A1 | 10/2017 |
| WO | 2018125686 | A2 | 7/2018 |
| WO | 2018210038 | A1 | 11/2018 |
| WO | 2019125767 | A1 | 6/2019 |
| WO | 2020148483 | A1 | 7/2020 |
| WO | 2021037327 | A1 | 3/2021 |
| WO | 2021038012 | A1 | 3/2021 |
| WO | 2021058111 | A1 | 4/2021 |
| WO | 2021113654 | A1 | 6/2021 |
| WO | 2021221736 | A2 | 11/2021 |
| WO | 2021231578 | A1 | 11/2021 |
| WO | 2021257856 | A1 | 12/2021 |
| WO | 2022002830 | A1 | 1/2022 |
| WO | 2022140170 | A1 | 6/2022 |
| WO | 2022154089 | A1 | 7/2022 |
| WO | 2023/122763 | A1 | 6/2023 |
| WO | 2023/177558 | A1 | 9/2023 |

OTHER PUBLICATIONS

Apple, DL coverage enhancement in NTN, R2-2404654, 3GPP TSG-RAN WG2 Meeting #126, Fukuoka, Japan, May 10, 2024, pp. 1-5.

InterDigital, Inc., NR-NTN downlink coverage enhancement, R1-2400576, 3GPP TSG RAN WG1 #116, Feb. 18, 2024, pp. 1-5.

International Search Report and Written Opinion received for PCT Patent Application No. PCT/US25/34504, mailed on Oct. 24, 2025, 10 pages.

International Search Report and Written Opinion received for PCT Patent Application No. PCT/US25/34647, mailed on Oct. 27, 2025, 9 pages.

Moderator (Thales), FL Summary #3: NR-NTN downlink coverage enhancements, R1-2401845 3GPP TSG RAN WG1 #116, Athens, Greece, Mar. 1, 2024, pp. 16-19.

* cited by examiner

GEOLOCATION BASED RESOURCE MANAGEMENT FOR SATELLITES IN A NON-TERRESTRIAL NETWORK

BACKGROUND

Current wireless communications systems utilize base stations to communicate with user equipment (UE). Base stations can be located at the surface of the Earth, and support telecommunications coverage in a surrounding area. When in a coverage region of the base station, a UE can connect with the base station to communicate data through the network. The fifth-generation mobile networks (5G and 5G Advanced) and the sixth-generation mobile system standard (6G) enable user equipment to communicate directly with an orbiting satellite. The user equipment can connect to a satellite when within a coverage region of the satellite. In general, a satellite can provide a larger coverage region and can more easily provide coverage to remote locations. Accordingly, network providers are utilizing non-terrestrial networks to increase coverage and provide improved networks. However, traditional resource management systems can lack the capability to allocate resources in real-time based on changing communication demands and network conditions. As a result, conventional systems often struggle to efficiently utilize available resources, leading to potential inefficiencies in resource allocation and energy consumption.

BRIEF DESCRIPTION OF THE DRAWINGS

Detailed descriptions of implementations of the present invention will be described and explained through the use of the accompanying drawings.

Figure 1:
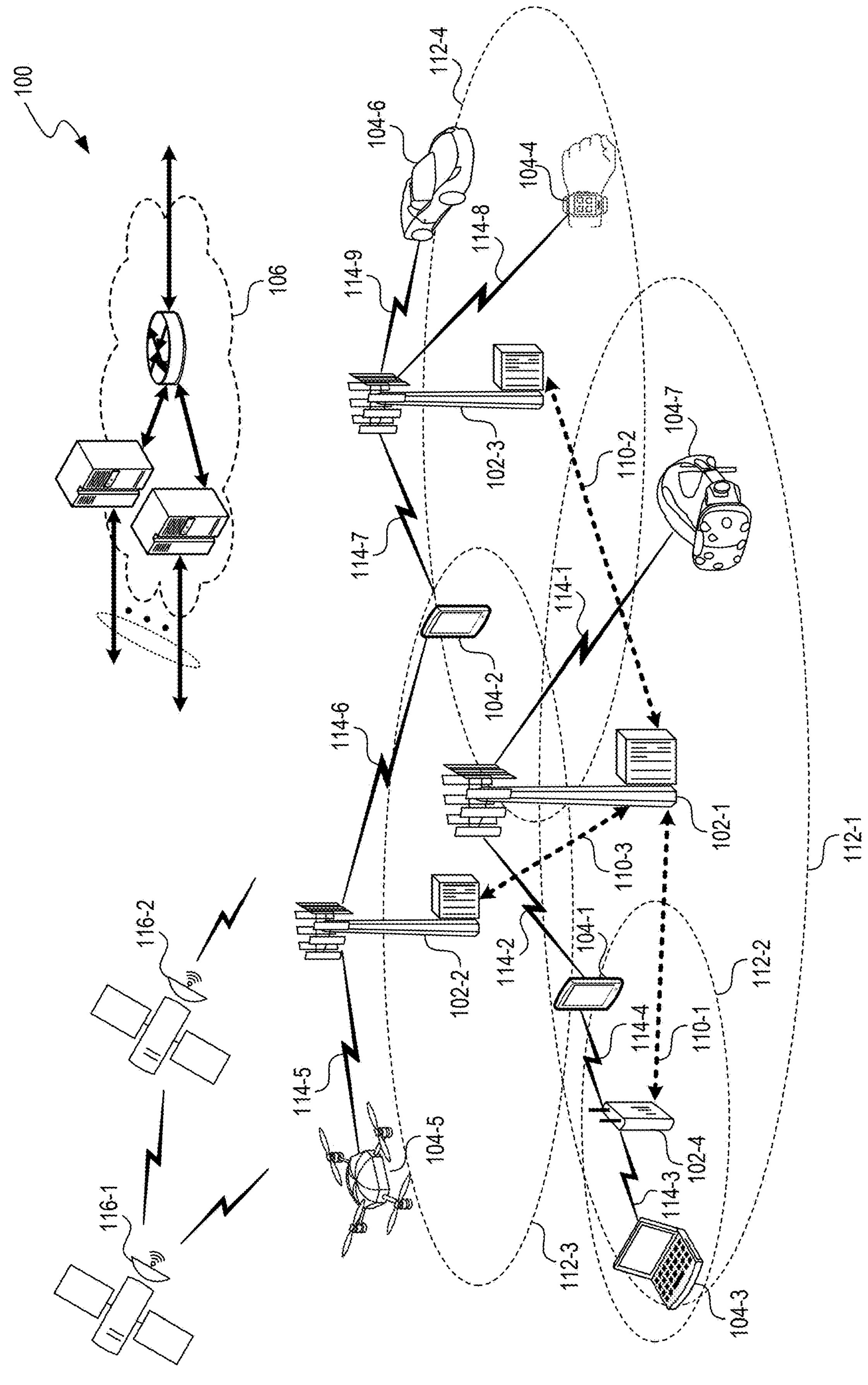
FIG. 1 is a block diagram that illustrates a wireless communications system that can implement aspects of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

New generations of wireless telecommunication networks, such as 5G, utilize satellites to improve network coverage. Given that satellites are not bound to the surface of the Earth, satellites can provide a larger coverage region than terrestrial base stations and more easily provide coverage in remote locations. As a consequence of this increased coverage region, a greater number of user devices may compete for communication resources provided by the satellite networks, thereby increasing congestion and use of the satellite's limited resources. Thus, satellite networks can be resource-constrained due to increased competition for limited communication resources. It is important to manage the resources so that the limited resources are not left unused.

The transmission power in non-terrestrial networks (NTNs) such as satellite communications determines the strength and reach of the signal of the satellite, which affects the coverage area and the quality of the communication link. Higher power levels can extend coverage and improve signal reliability, which is particularly useful in challenging environments with obstacles or interference. However, higher power consumption also demands more energy resources, which is a significant constraint for satellites relying on limited onboard power sources like solar panels. Bandwidth, on the other hand, defines the capacity of the communication channel, and affects the data rate and the ability of the satellite to handle multiple simultaneous device connections. Wider bandwidths enable higher data throughput, which is particularly useful for delivering high-speed internet and other bandwidth-intensive services.

Conventional systems often lack the ability to dynamically adjust the satellite network's transmission parameters (e.g., transmit power, channel bandwidth) based on real-time network conditions. For example, conventional approaches typically involve a static allocation of resources, such as transmit power and channel bandwidth, without considering the varying communication demands and environmental factors of the satellite network. Thus, conventional systems may struggle to efficiently manage power consumption because the system often operates at constant power levels regardless of the actual communication needs or the presence of active connections.

Static allocation of resources may struggle to manage network congestion and allocate resources efficiently. In scenarios where multiple satellites with varying connection demands coexist within the network, the lack of an environmentally-aware network resource management system can exacerbate congestion issues, leading to increased latency, packet collisions, and degraded throughput for all users. This congestion not only affects the performance of individual applications but also decreases the overall network efficiency and capacity utilization, lowering the ability of non-terrestrial networks to accommodate growing user demands and scale effectively. Additionally, the scalability of satellite networks is limited since the power resource of a satellite network is solar power, which is a limited resource. Transmitting resources to satellites that are not connected to any devices wastes the limited resources (e.g., solar power).

This document discloses methods, systems, and apparatuses for managing the resources of a network device (e.g., a satellite) in a non-terrestrial network based on the presence of an RRC connection to the satellite network. The system allocates a frequency band to the satellite within the NTN. The satellite determines the channel bandwidth available for data transmissions of a service within this frequency band using/based on the satellite's transmit power capabilities. The satellite identifies a geographical location that supports the service within the available channel bandwidth as the satellite orbits over the geographical location. While orbiting over the geographical location, the satellite detects whether there is an absence of the RRC connection between at least one terminal device and the satellite within the geographical area. The management of the RRC connection between the satellite and the terminal device is governed by an RRC protocol. Upon detecting the absence of an RRC connection, the satellite transmits signals at a reduced transmit power and uses only a portion of the available channel bandwidth towards the geographical location. The system allows the satellite to conserve energy while maintaining coverage and service availability.

In some implementations, the satellite detects a connection request between an additional terminal device and the satellite, where the connection request is managed by the RRC protocol. Upon detecting the connection request, the satellite transitions to full transmit power and uses the whole channel bandwidth. In some implementations, the signals transmitted by the satellite toward the geographical location include pilot signals or cell reference signals. The data transmissions to the geographical location can be conducted over radio resources including physical resource blocks (PRBs). The allocated frequency band for these transmissions can include Frequency Range 1 (FR1), S band, or L band.

The benefits and advantages of the implementations described herein include addressing the inefficiencies in power consumption and resource allocation in NTNs. By dynamically adjusting the satellite's transmission power and bandwidth based on the presence or absence of RRC connections, the system significantly reduces energy usage without compromising service availability by ensuring that only satellites with RRC connections transmit the necessary resources. The adaptive approach ensures an improved use of available resources by conserving valuable network bandwidth and energy resources, which extends the operational lifespan of satellites and improves the overall sustainability of satellite communications.

Furthermore, the adaptive nature of the network's resource management enables non-terrestrial networks to manage network congestion more effectively and allocate resources dynamically to satellites or other network devices based on real-time demands. By adjusting the transmitted resources according to the connection status of the particular satellite, the system helps alleviate congestion issues and improve resource utilization within the network. The approach not only improves the performance of individual devices but also enhances the overall network efficiency and capacity utilization, enabling non-terrestrial networks to accommodate growing user demands and scale effectively in response to changing connection patterns.

The methods disclosed herein cause a reduction in greenhouse gas emissions compared to traditional methods for operating telecommunication networks. Every year, approximately 40 billion tons of $CO^2$ are emitted around the world. Power consumption by digital technologies including telecommunications networks account for approximately 4% of this figure. Further, conventional user device and application settings can sometimes exacerbate the causes of climate change. For example, the average U.S. power plant expends approximately 500 grams of carbon dioxide for every kWh generated. The implementations disclosed herein for conserving network resources can mitigate climate change by reducing and/or preventing additional greenhouse gas emissions into the atmosphere. For example, reducing the transmitted power and using only a portion of the bandwidth in response to an absence of RRC connections with the satellite to avoid unnecessary data communication as described herein reduces electrical power consumption and the amount of data downloaded/uploaded compared to traditional methods for transmitting resources from the satellite. In particular, by adjusting the transmitted resources based on the presence of RRC connections with the satellite, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Adjusting the transmitted resources of satellite networks according to the embodiments disclosed herein reduces the amount of data downloaded, and obviates the need for wasteful $CO^2$ emissions. Therefore, the disclosed implementations for reconfiguring the amount of resources transmitted by satellite networks mitigates climate change and the effects of climate change by reducing the amount of data stored and downloaded in comparison to conventional network technologies.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 502.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces for LTE) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., Xn interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a non-terrestrial network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
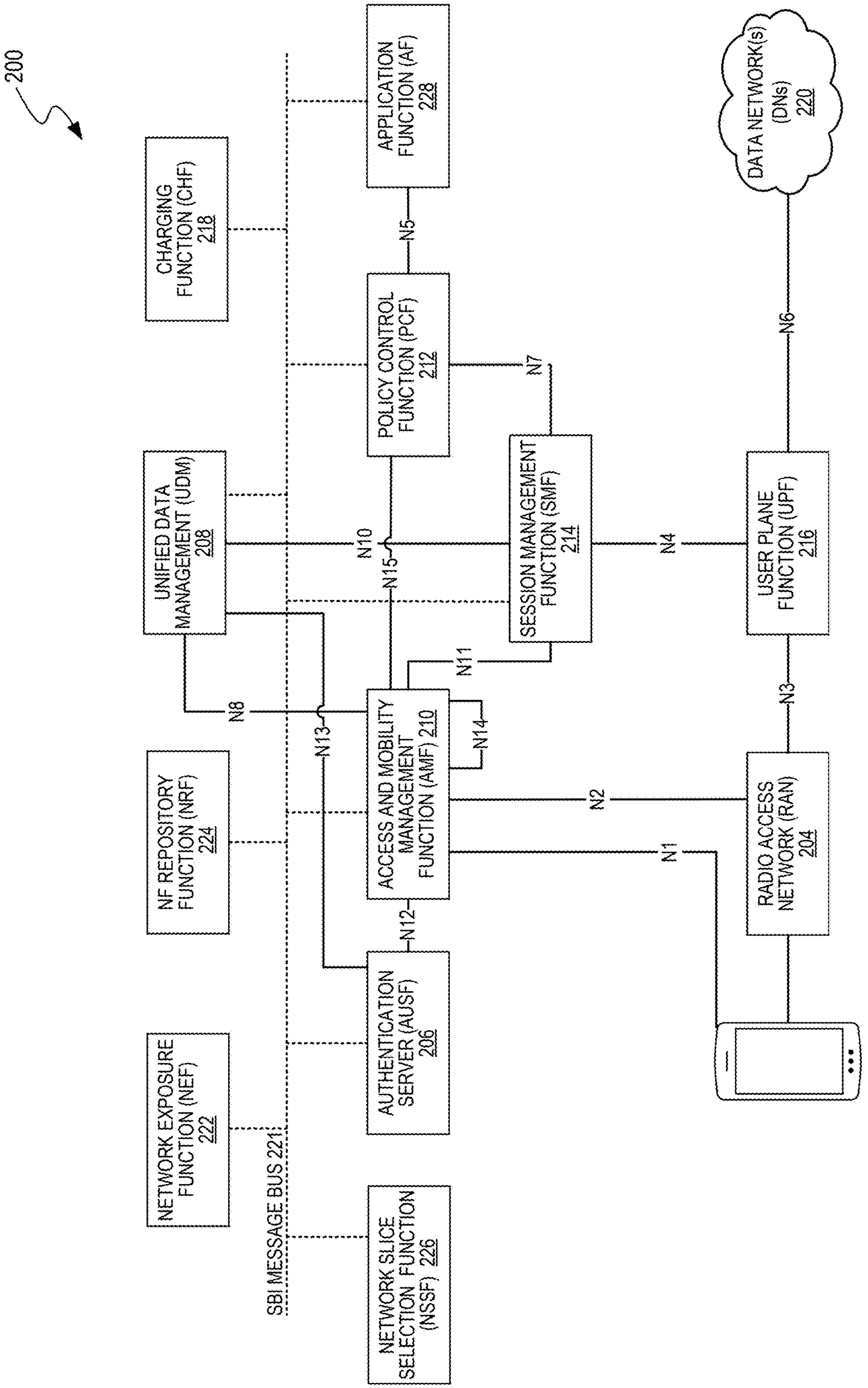
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228.

The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

UE Connection Management System

Figure 3A:
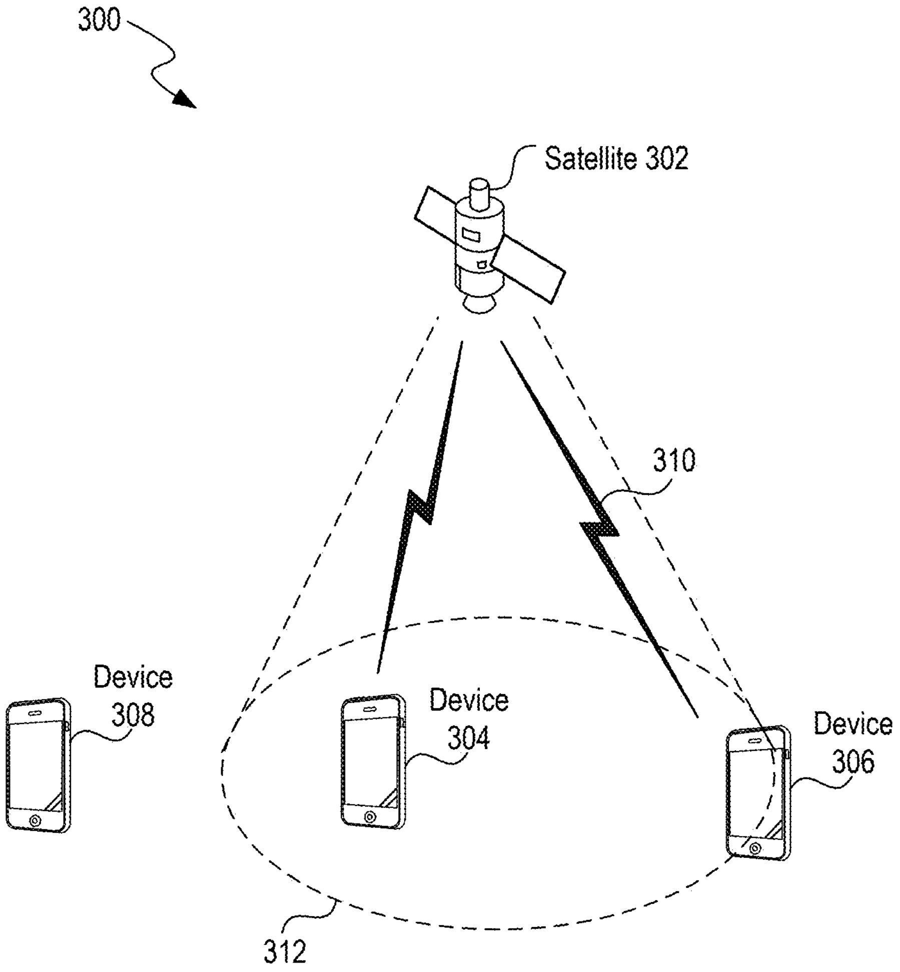
FIG. 3A is a block diagram that illustrates an example wireless communications system including a satellite in a non-terrestrial network using full power and the available channel bandwidth when there is a Radio Resource Control (RRC) connection present, in accordance with one or more implementations of this disclosure.

FIG. 3A is a block diagram that illustrates an example wireless communications system 300 including a satellite in a non-terrestrial network using full power and the whole channel bandwidth when there is a Radio Resource Control (RRC) connection present, in accordance with one or more implementations of this disclosure. A non-terrestrial network can, as an alternative to satellite 302, include high-altitude platforms (HAPs), such as stratospheric balloons, blimps, or the like. The wireless communications system 300 is implemented using components of the example computer system 500 illustrated and described in more detail with reference to FIG. 5. For example, the wireless communications system 300 can be implemented using processor 502 and instructions 508 programmed in the memory 506 illustrated and described in more detail with reference to FIG. 5. Likewise, implementations of the wireless communications system 300 can include different and/or additional components or be connected in different ways.

In some examples, the wireless communications system 300 implements aspects of the wireless telecommunications network 100 illustrated and described in more detail with reference to FIG. 1. The wireless communications system 300 includes satellite 302, and UE 304, 306, 308. Satellite 302 and UE 304, 306, 308 are examples of the corresponding devices illustrated and described in more detail with reference to FIG. 1. Satellite 302 is the same as or similar to satellites 116-1 and 116-2 in FIG. 1. A geographical area associated with a transmission beam of satellite 302 is sometimes called a beam footprint 312, and UE 304, 306, 308 can communicate with the satellite 302 while the UE 304, 306, 308 is located within the beam footprint 312. For example, in FIG. 3A, since UE 308 is positioned beyond the geographical area of the beam footprint 312, UE 308 stands disconnected from the satellite 302. Additionally, in FIG. 3A, devices such as UE 306 on the border of the geographical area of the beam footprint 312 are still within the geographical area defined by the beam footprint 312, thereby maintaining the ability to establish an RRC connection 310.

Within the beam footprint 312, UEs 304, 306, 308 can control the establishment and maintenance of RRC connections 310 within the wireless communications system 300. As a layer 3 protocol operating within the air interface of wireless telecommunications networks, the RRC protocol governs the signaling procedures necessary for initiating, configuring, and releasing RRC connections between UEs and the non-terrestrial network represented by the satellite 302. RRC connections 310 are a dedicated link established between the UEs 304, 306 and the satellite 302 to facilitate the exchange of control and user data. Specifically, RRC connections 310 can enable the transmission of various types of data through data bearer, including signaling messages that help configure the UE's 304, 306 communication parameters, manage mobility, and manage the use of network resources. By maintaining the RRC connections 310, the RRC protocol ensures that the UE 304, 306 and the satellite 302 can communicate effectively.

When a UE, such as UE 304, 306, requests to connect with satellite 302, the RRC protocol selects connection parameters, such as radio resource allocation and transmission modes, to ensure efficient and reliable data (e.g., communication data) exchange. The RRC protocol selects connection parameters including radio resource allocation, which determines how frequency and time resources are assigned to the UE, and transmission modes, which define how data is modulated and transmitted over the air interface. Throughout the RRC connection 310, the RRC protocol monitors the quality of the radio link, facilitates handovers between different cells or beams within the satellite's 302 coverage area (e.g., beam footprint 312), and coordinates transitions between different connection states, such as idle, connected, and inactive modes.

In FIG. 3A, since there is a presence of RRC connections 310, satellite 302 can use full power and/or the entire channel bandwidth. By using the full bandwidth, the satellite can use increased data throughput, accommodating higher data rates and supporting more simultaneous connections of devices. This allows the satellite to deliver high-speed internet and other data-intensive services to users, to ensure a high-quality user experience even in remote areas. When RRC connections 310 are established (e.g., RRC connections 310 associated with UE 304, 306), the satellite 302 can dynamically adjust the satellite's 302 transmission parameters to meet demands of data exchange. Methods of dynamically adjusting the satellite's 302 transmission parameters are discussed with reference to FIG. 4.

Figure 3B:
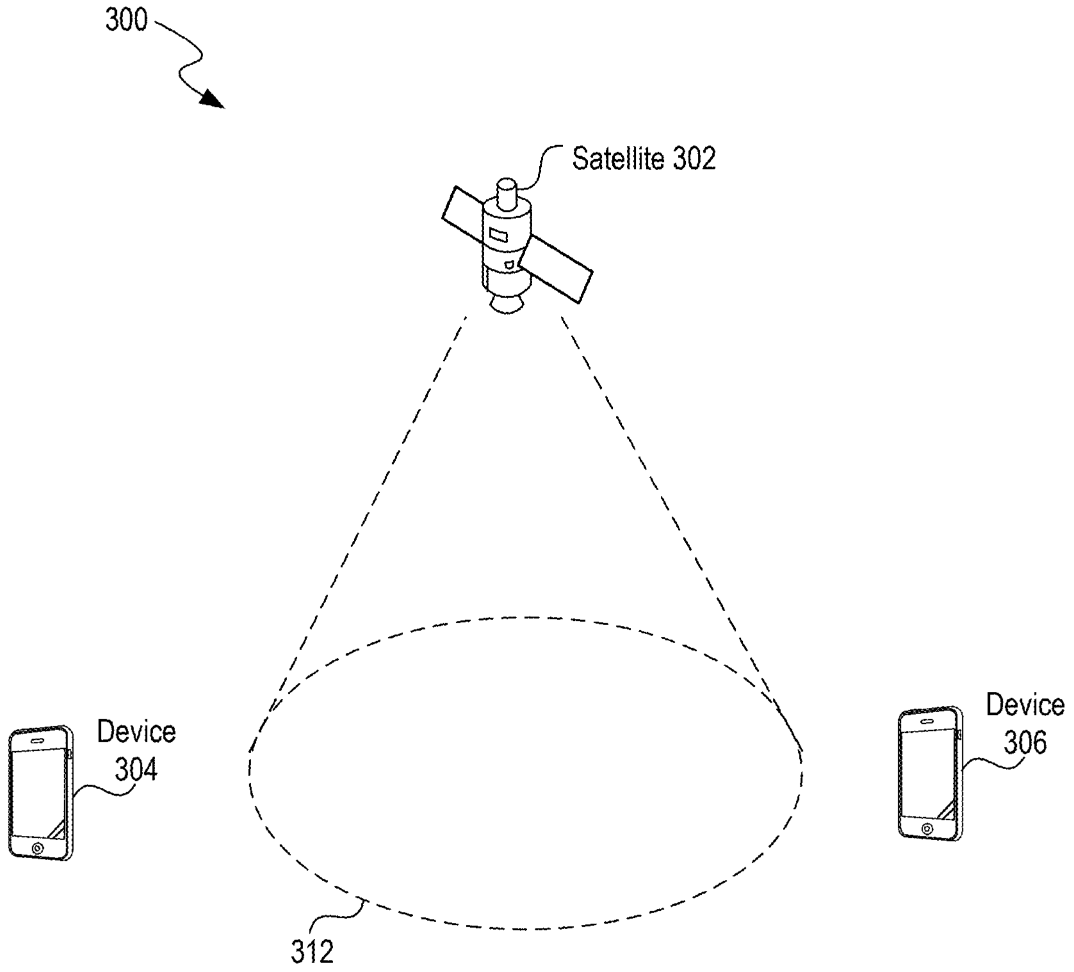
FIG. 3B is a block diagram that illustrates an example wireless communications system including a satellite in a non-terrestrial network using low power and a portion of the channel bandwidth when there is no RRC connection present, in accordance with one or more implementations of this disclosure.

FIG. 3B is a block diagram that illustrates an example wireless communications system 300 including a satellite 302 in a non-terrestrial network using low power and a portion of the channel bandwidth when there is no RRC connection 310 present, in accordance with one or more implementations of this disclosure. An example satellite 302 is illustrated and described in more detail with reference to FIG. 1 and FIG. 3A.

In FIG. 3B, UE 304, 306 are positioned outside the beam footprint 312, so UE 304, 306 remain disconnected from the satellite's 302 communication network and thus lack an RRC connection 310. In response to the absence of RRC connections 310 within the beam footprint 312, meaning that no UE within the satellite's coverage area (beam footprint 312) is actively communicating, the satellite 302 dynamically adjusts the satellite's 302 transmission parameters, such as using lower power transmission and utilizing only a portion of the available channel bandwidth.

The adjusted transmission parameters can include reducing the transmission power to the minimum level necessary to maintain basic network functionality and broadcast essential signals, such as pilot signals or cell reference signals. Pilot signals and cell reference signals (discussed further with reference to FIG. 4) are used to inform potential users of the satellite's 302 presence and availability, ensuring that UE 304, 306 can detect and connect when needed. Additionally, the adjusted transmission parameters can include causing the satellite 302 to only use a portion of the available channel bandwidth. By narrowing the bandwidth, the satellite 302 can further reduce resource consumption, as fewer resources are needed to transmit signals over a smaller frequency range. The satellite 302 can then conserve the limited resources and better allocate the satellite's 302 resources to instances when there are RRC connections. Methods of dynamically adjusting the satellite's 302 transmission parameters are discussed with reference to FIG. 4.

Figure 3C:
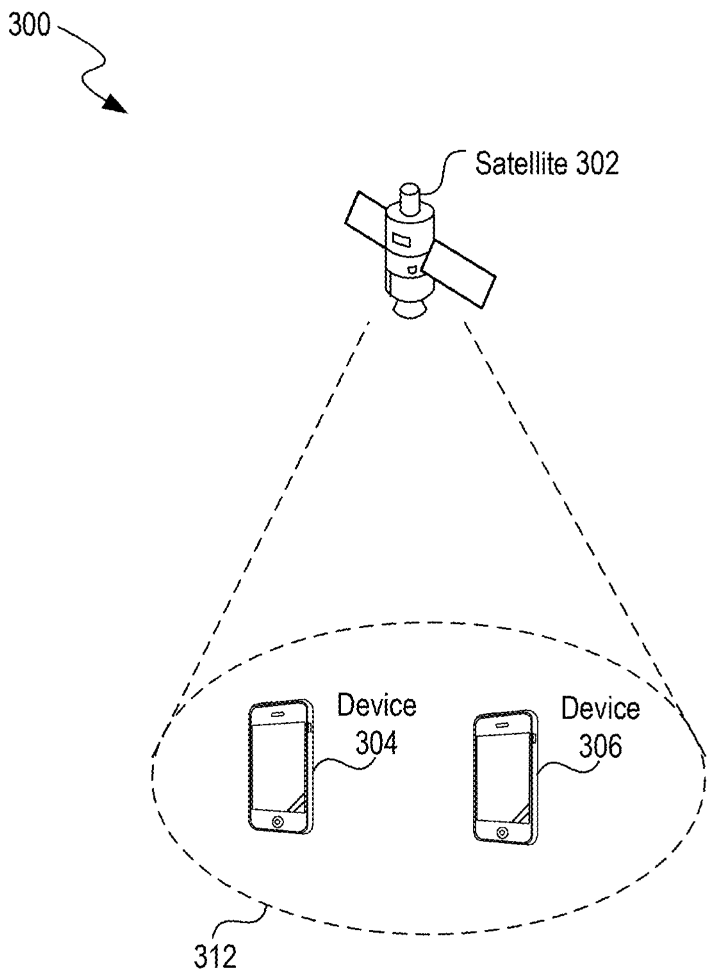
FIG. 3C is a block diagram that illustrates an example wireless communications system including a satellite in a non-terrestrial network using low power and a portion of the channel bandwidth with devices present in a geographical position supported by a service and no RRC connection present, in accordance with one or more implementations of this disclosure.

FIG. 3C is a block diagram that illustrates an example wireless communications system 300 including a satellite 302 in a non-terrestrial network using low power and a portion of the channel bandwidth with devices present in a geographical position supported by a service and no RRC connection 310 present, in accordance with one or more implementations of this disclosure. An example satellite 302 and UE 304, 306 are illustrated and described in more detail with reference to FIG. 1 and FIG. 3A.

In FIG. 3C, certain UE entities (e.g., UEs 304, 306) may be within the coverage area (e.g., beam footprint 312) supported by the satellite's 302 service, but not have an established RRC connection 310 between the satellite 302 and the UEs 304, 306. The satellite 302 can dynamically adjust the satellite's 302 transmission parameters, using low-power transmission and using only a portion of the available channel bandwidth since there is no RRC connection 310. Despite the presence of UE entities (e.g., UEs 304, 306) within the beam footprint 312, the absence of RRC connections prompts the satellite 302 to conserve energy and reduce the transmitted resources. Methods of dynamically adjusting the satellite's 302 transmission parameters are discussed with reference to FIG. 4.

Figure 4:
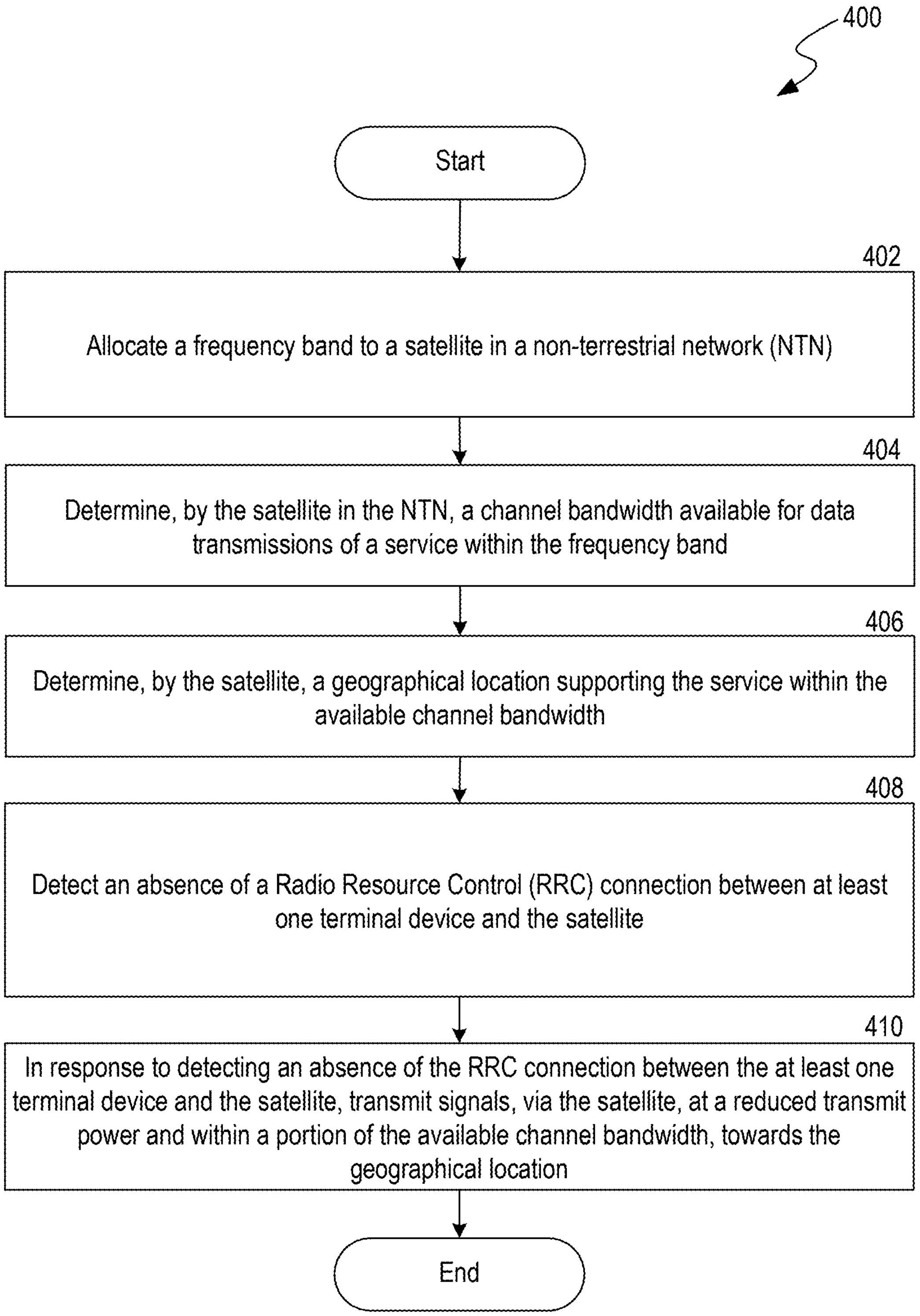
FIG. 4 is a flowchart that illustrates a process for managing resources of satellites in a non-terrestrial network using geolocation in accordance with aspects of the present technology.

FIG. 4 is a flowchart that illustrates a process 400 for managing resources of satellites in a non-terrestrial network using geolocation in accordance with aspects of the present technology. In some implementations, the process 400 is performed by components of example wireless devices 104 illustrated and described in more detail with reference to FIG. 1. Likewise, implementations can include different and/or additional steps or can perform the steps in different orders.

In act 402, the system allocates a frequency band to a satellite in an NTN. The system identifies the available frequency bands that are suitable for satellite communication, considering factors such as regulatory constraints, existing spectrum allocations, and the specific requirements of the NTN. Once the suitable frequency bands are identified, the system assigns a specific frequency band to the satellite by coordinating with ground-based control stations and ensuring that the allocated frequency band does not interfere with other terrestrial or satellite communications. The allocated frequency band is then programmed into the satellite's communication system, enabling the satellite to operate within the designated spectrum.

In some implementations, the allocated frequency band is Frequency Range 1 (FR1), S band, or L band depending on the communication needs. Frequency Range 1 (FR1) encompasses sub-6 GHz frequencies, specifically from 450 MHz to 6 GHz. The lower frequencies in FR1 enable improved penetration through obstacles like buildings and vegetation, and is commonly used in challenging environments such as remote or rural regions where terrestrial networks may be sparse or nonexistent. The S band, which spans frequencies from 2 to 4 GHz, is commonly used to deliver communication services over wide areas. The L band, covering frequencies from 1 to 2 GHz, is commonly used in satellite navigation systems (e.g., GPS), mobile satellite communication, and asset tracking services.

In act 404, the system determines, by the satellite in the NTN, a channel bandwidth available for data transmissions of a service within the frequency band. The satellite can be configured to use a transmit power. The satellite scans the allocated frequency band to assess the current spectral environment by detecting and analyzing signals to identify any occupied sub-bands or potential sources of interference. The satellite can calculate the channel bandwidth that can be used for data transmissions without overlapping with other active signals. The satellite then configures the satellite's transceivers to operate within the determined channel bandwidth. Additionally, the satellite can evaluate the satellite's current transmit power capabilities, considering factors such as power availability from its solar panels, current energy consumption, and the operational requirements of the service. By integrating these parameters, the satellite ensures that the selected channel bandwidth and transmit power are aligned to provide reliable data transmission to UEs within the coverage area.

In some implementations, the data transmissions of the service to the geographical location are over radio resources including physical resource blocks (PRBs). The system allocates PRBs within the available channel bandwidth for the transmission of data. The allocation process includes partitioning the channel bandwidth into discrete PRBs, each representing a specific frequency-time resource unit. These PRBs are then assigned to individual UE or data streams based on factors such as data demand, quality of service requirements, and channel conditions. The system modulates the data onto the allocated PRBs using appropriate modulation schemes, such as Quadrature Amplitude Modulation (QAM), and transmits them over the air interface. At the receiving end, the UE demodulates the received signals from the allocated PRBs to recover the transmitted data.

In act 406, the system determines, by the satellite, a geographical location (e.g., beam footprint 312 in FIGS. 3A-3C) supporting the service within the available channel bandwidth. The satellite is orbiting over the geographical location. For example, Global Navigation Satellite Systems (GNSS) or positioning technologies can be used to determine the satellite's position and velocity. Using this positional information, along with the satellite's orbit parameters, the system calculates the footprint or coverage area on the Earth's surface that falls within the available channel bandwidth. As the satellite orbits, the satellite continuously updates the satellite's own position data, allowing the satellite to identify which geographical regions fall within the satellite's coverage area at any given time.

In act 408, the system detects an absence of a RRC connection between at least one terminal device and the satellite. The terminal device is the same as or similar to UEs 304, 306, 308 discussed with reference to FIGS. 3A-3C. The at least one terminal device is within the geographical location (e.g., UEs 304, 306 in FIG. 3A). The RRC connection between the satellite and the at least one terminal device is managed by an RRC protocol. In some implementations, the satellite checks for the presence of signaling messages that are typically exchanged during an active RRC connection, such as connection requests, acknowledgments, data transfer signals, and periodic control messages. If the signaling messages are not detected within a specified time frame, the system concludes that there is no active RRC connection.

In some implementations, the specified time frame is based on an RRC inactivity timer. Inactivity timers are used to manage the duration of connections between the satellite network and the UE during periods of data inactivity, helping to conserve battery power and alleviate network congestion. When a UE completes a data transmission session and ceases to transmit or receive information with the satellite network, the inactivity timer begins counting down. If no further data activity is detected before the expiration of the timer, the UE is released from the active connected mode to the idle mode.

In act 410, in response to detecting an absence of the RRC connection between the at least one terminal device and the satellite, the system transmits signals, via the satellite, at a reduced transmit power and within a portion of the available channel bandwidth, towards the geographical location.

The system dynamically adjusts the output power level of the satellite's transmitters, lowering it to a predetermined level that is sufficient to maintain essential communication functions while minimizing energy consumption. The adjustment can include modifying the voltage supplied to the transmitter amplifiers or adjusting the transmission gain to decrease the signal strength and the satellite's overall power consumption.

In some implementations, digital filters are used to limit the signal's frequency spectrum, ensuring that only the desired portion of the channel bandwidth is utilized. The digital filters selectively attenuate frequencies outside the target bandwidth, thereby confining the signal within the designated boundaries. For example, components of the signal that do not fall within the specified range are reduced or eliminated. By transmitting within a narrower bandwidth, fewer PRBs are needed to support the communication link.

Transmitting the signals at the reduced transmit power and within the portion of the available channel bandwidth can reduce a power density of the satellite associated with the geographical location. By operating at lower power levels and using a narrower bandwidth allocation, the satellite decreases the concentration of electromagnetic energy radiated within the coverage area. This reduction in power density reduces the potential for electromagnetic interference with other satellite systems, terrestrial networks, or sensitive electronic equipment operating within the vicinity. Moreover, the reduction in power density improves the overall efficiency and longevity of the satellite's onboard power systems, such as solar panels and energy storage units, by reducing the energy consumption required for transmission activities.

In some implementations, the signals transmitted by the satellite towards the geographical location are pilot signals and/or cell reference signals. The signals can indicate a presence and an availability of the satellite for the data transmissions of the service in the geographical location. The system periodically broadcasts pilot signals, which are low-power reference signals that provide a beacon for terminal devices within the coverage area. These pilot signals typically contain information such as synchronization timing, carrier frequency, and satellite identification parameters, enabling terminal devices to detect and establish communication links with the satellite. The satellite can transmit cell reference signals, which serve as identifiers for specific cells or sectors within the satellite's coverage area. These signals assist terminal devices in determining the optimal cell or sector for communication based on factors such as signal strength, signal quality, and available capacity. By broadcasting cell reference signals, the satellite enables terminal devices to perform cell selection and handover procedures. By periodically broadcasting pilot and cell reference signals, the satellite effectively communicates its operational status and readiness to serve communication needs within the designated area. Terminal devices receiving these signals can interpret them to gauge the satellite's coverage footprint, signal strength, and suitability for establishing communication links.

In some implementations, the system detects, by the satellite, a connection request between an additional terminal device and the satellite. The connection request between the additional terminal device and the additional terminal device is managed by an RRC protocol. Once the satellite detects a connection request from the additional terminal device, the satellite triggers a series of actions to transition from a low-power, narrow-bandwidth state to a full-power, full-bandwidth state. For example, the satellite adjusts the satellite's power amplifiers to increase the transmit power to the full operational level, and reconfigures the satellite's frequency allocation to use the full available channel bandwidth to ensure increased data throughput and quality of service (e.g., higher data rates, reduced latency) for the connected terminal device.

In some implementations, in response to detecting the absence of an RRC connection between the at least one terminal device and the satellite, the system can restrict the data transmissions of the service towards the geographical location. The system can dynamically regulate the flow of data packets within the network. At the network layer, the system can employ packet filtering and routing techniques to selectively drop or reroute data packets destined for the geographical location in which the absence of an RRC connection is detected. By intercepting data packets at the network ingress points, the system prevents the packets from being forwarded towards the satellite for transmission, halting the delivery of non-essential data to the disconnected geographical area.

Similarly, at the data link layer, in some implementations, the system can implement access control mechanisms to restrict terminal devices within the disconnected geographical location from accessing the satellite's transmission resources. This may include temporarily disabling access points or enforcing bandwidth quotas to limit the transmission capacity available to devices within the affected area. By controlling access to the satellite's transmission resources, the system ensures that network resources are efficiently utilized and prioritized for areas where active communication sessions are established.

Computer System

Figure 5:
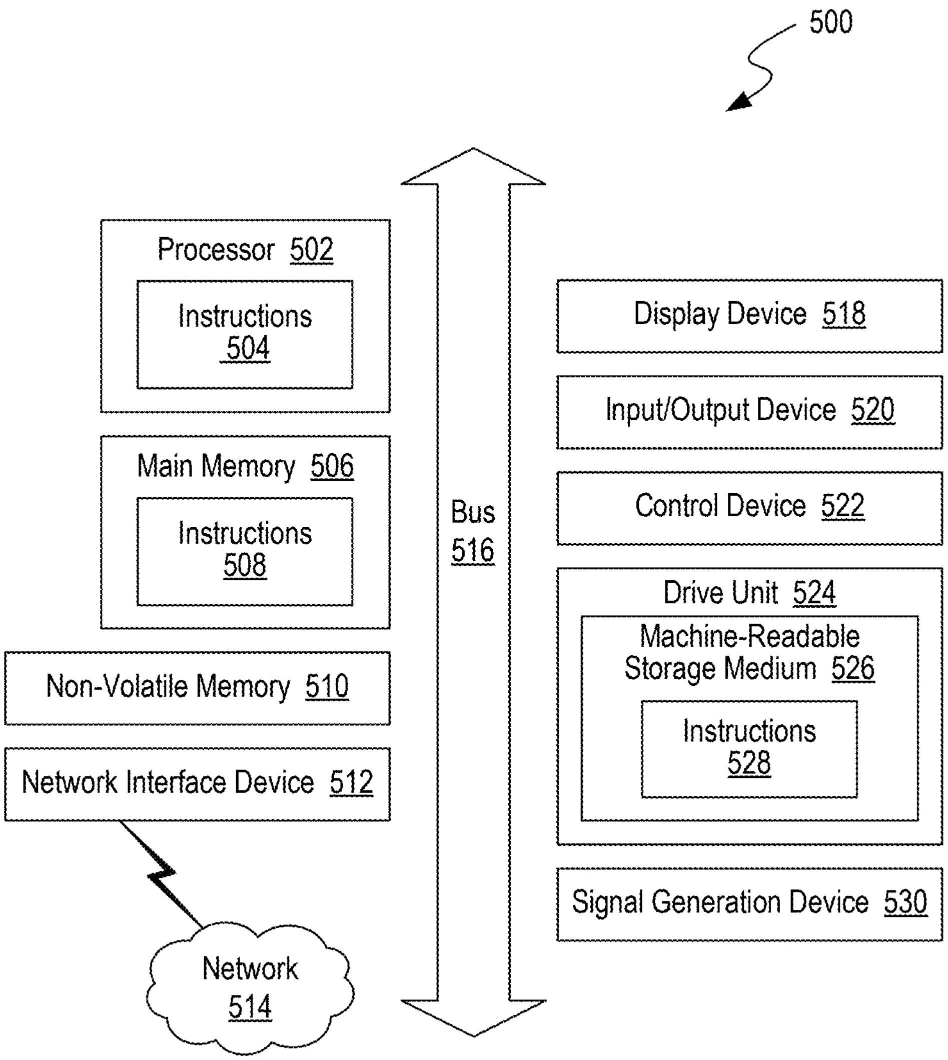
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example" and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:

at least one hardware processor; and at least one non-transitory memory storing instructions, which, when executed by the at least one hardware processor, cause the system to:

allocate a frequency band to a satellite in a non-terrestrial network (NTN);

determine, by the satellite in the NTN, a channel bandwidth available for data transmissions of a service within the frequency band, wherein the satellite is configured to use a transmit power;

determine, by the satellite, a geographical location supporting the service within the available channel bandwidth, wherein the satellite is orbiting over the geographical location;

detect an absence of a Radio Resource Control (RRC) connection between at least one terminal device and the satellite, wherein the at least one terminal device is within the geographical location, and wherein the RRC connection between the satellite and the at least one terminal device is managed in accordance with an RRC protocol; and in response to detecting an absence of the RRC connection between the at least one terminal device and the satellite, transmit signals, via the satellite, at a reduced transmit power and within a portion of the available channel bandwidth, towards the geographical location.

2. The system of claim 1, wherein the system is caused to:

detect, by the satellite, a connection request between an additional terminal device and the satellite, wherein the connection request between the additional terminal device and the additional terminal device is managed by the RRC protocol;

upon detection of the connection request, transition the satellite to the transmit power and within the whole channel bandwidth.

3. The system of claim 1, wherein the signals transmitted by the satellite towards the geographical location are pilot signals and/or cell reference signals, wherein the signals indicate a presence and an availability of the satellite for the data transmissions of the service in the geographical location.

4. The system of claim 1, wherein the data transmissions of the service to the geographical location are performed using radio resources comprising physical resource blocks.

5. The system of claim 1, wherein the allocated frequency band is:

Frequency Range 1 (FR1),

S band, and/or

L band.

6. The system of claim 1, wherein the system is caused to:

reduce greenhouse gas emissions by reducing (i) a power density of the satellite and (ii) energy consumed by the satellite associated with the geographical location by transmitting the signals at the reduced transmit power and within the portion of the available channel bandwidth reduces a power density of the satellite associated with the geographical location.

7. The system of claim 1, wherein the system is caused to:

in response to detecting the absence of an RRC connection between the at least one terminal device and the satellite, restrict the data transmissions of the service towards the geographical location.

8. A non-transitory, computer-readable storage medium comprising instructions recorded thereon, wherein the instructions when executed by at least one data processor of a computer system, cause the computer system to:

allocate a frequency band to a satellite in a non-terrestrial network (NTN);

determine, by the satellite in the NTN, a channel bandwidth available for data transmissions of a service within the frequency band, wherein the satellite is configured to use a transmit power;

determine, by the satellite, a geographical location supporting the service within the available channel bandwidth, wherein the satellite is orbiting over the geographical location;

identify, by the satellite, an absence of a Radio Resource Control (RRC) connection between a terminal device and the satellite, wherein the at least one terminal device is within the geographical location, wherein the RRC connection between the satellite and the at least one terminal device is managed by an RRC protocol; and in response to the identified absence, adjust transmit power and/or the available channel bandwidth associated with the satellite for the data transmissions of the service to the geographical location, wherein the transmit power and/or the bandwidth associated with the satellite are reduced.

9. The non-transitory, computer-readable storage medium of claim 8, wherein the instructions cause the system to:

detect, by the satellite, a connection request between an additional terminal device and the satellite, wherein the connection request between the additional terminal device and the additional terminal device is managed by the RRC protocol;

upon detection of the connection request, transition the satellite to full transmit power and within the whole channel bandwidth.

10. The non-transitory, computer-readable storage medium of claim 8, wherein signals transmitted by the satellite towards the geographical location are pilot signals and/or cell reference signals, wherein the signals indicate a presence and an availability of the satellite for the data transmissions of the service in the geographical location.

11. The non-transitory, computer-readable storage medium of claim 8, wherein the data transmissions of the service to the geographical location are over radio resources comprising physical resource blocks.

12. The non-transitory, computer-readable storage medium of claim 8, wherein reducing the transmit power and/or the bandwidth associated with the satellite in response to the identified absence of the RRC connection between the terminal device and the satellite, reduces electrical power consumption of the satellite.

13. The non-transitory, computer-readable storage medium of claim 8, wherein the instructions cause the system to:

reduce greenhouse gas emissions by reducing (i) a power density of the satellite and (ii) energy consumed by the satellite associated with the geographical location by transmitting signals, via the satellite, at a reduced transmit power and within a portion of the available channel bandwidth, towards the geographical location.

14. The non-transitory, computer-readable storage medium of claim 8, wherein the instructions cause the system to:

in response to detecting an absence of an RRC connection between the at least one terminal device and the satellite, restrict the data transmissions of the service towards the geographical location.

15. A method comprising:

allocating a frequency band to a satellite in a non-terrestrial network (NTN);

determining, by the satellite in the NTN, a channel bandwidth available for data transmissions of a service within the frequency band, determining, by the satellite, a geographical location supporting the service within the available channel bandwidth, wherein the satellite is orbiting over the geographical location;

determining a presence of a Radio Resource Control (RRC) connection between at least one terminal device and the satellite, wherein the at least one terminal device is within the geographical location, wherein the RRC connection between the satellite and the at least one terminal device is managed by an RRC protocol, wherein the satellite uses a transmit power and an available channel bandwidth for the data transmissions of the service to the geographical location;

detecting an absence of the RRC connection between the at least one terminal device and the satellite;

in response to determining the absence of the RRC connection between the at least one terminal device and the satellite, adjusting transmission power and/or bandwidth associated with the NTN, wherein the transmission power and/or the bandwidth associated with the NTN are reduced.

16. The method of claim 15, wherein the data transmissions of the service to the geographical location are over radio resources comprising physical resource blocks.

17. The method of claim 15, wherein signals transmitted by the satellite towards the geographical location are pilot signals and/or cell reference signals, wherein the signals indicate a presence and an availability of the satellite for the data transmissions of the service in the geographical location.

18. The method of claim 15, wherein the allocated frequency band is:

Frequency Range 1 (FR1),

S band, and/or

L band.

19. The method of claim 15, comprising:

reducing greenhouse gas emissions by reducing (i) a power density of the satellite and (ii) energy consumed by the satellite associated with the geographical location by transmitting signals, via the satellite, at a reduced transmit power and within a portion of the available channel bandwidth, towards the geographical location.

20. The method of claim 15, comprising:

in response to detecting the absence of an RRC connection between the at least one terminal device and the satellite, restricting the data transmissions of the service towards the geographical location.

* * * * *